US012722778B1

(12) United States Patent
Tseng et al.

(10) Patent No.: US 12,722,778 B1
(45) Date of Patent: Sep. 1, 2026

(54) FLAPPING-WING AERIAL VEHICLE

(71) Applicants: Pioneer Material Precision Tech Co., Ltd., New Taipei City (TW); National Yang Ming Chiao Tung University, Hsinchu City (TW)

(72) Inventors: Kuan-Yu Tseng, Hsinchu City (TW); Gih Keong Lau, Muar (MY); Wei-Yu Huang, New Taipei City (TW); Chih-Sheng Chen, New Taipei City (TW); Li-Yuan Yeh, New Taipei City (TW); Chang-Qi Zhang, New Taipei City (TW)

(73) Assignees: Pioneer Material Precision Tech Co., Ltd., New Taipei City (TW); National Yang Ming Chiao Tung University, Hsinchu City (TW)

( * ) Notice: Subject to any disclaimer, the term of this patent is extended or adjusted under 35 U.S.C. 154(b) by 0 days.

(21) Appl. No.: 19/203,203

(22) Filed: May 9, 2025

(30) Foreign Application Priority Data

Apr. 22, 2025 (TW) ................................ 114115088

(51) Int. Cl.
*B64C 33/02* (2006.01)

(52) U.S. Cl.
CPC .................................... *B64C 33/02* (2013.01)

(58) Field of Classification Search
CPC ........ B64C 33/00; B64C 33/02; B64C 33/025
See application file for complete search history.

(56) References Cited

U.S. PATENT DOCUMENTS 11,479,355 B2 10/2022 Benedict

FOREIGN PATENT DOCUMENTS

| | | | | |
|---|---|---|---|---|
| CN | 211685617 U | * 10/2020 | ............. | B64C 33/00 |
| CN | 114987756 A | * 9/2022 | ............. | B64C 33/00 |
| CN | 115593622 | 1/2023 | | |
| CN | 115593622 A | * 1/2023 | ............. | B64C 33/02 |
| CN | 117326110 A | * 1/2024 | ............. | B64U 10/40 |
| CN | 118992145 | 11/2024 | | |

* cited by examiner

*Primary Examiner* — Justin Michael Heston
(74) *Attorney, Agent, or Firm* — Winston Hsu

(57) ABSTRACT

A flapping-wing aerial vehicle includes a body, a driving mechanism, a transmission mechanism and a flapping-wing mechanism. The driving mechanism is fixed to the body. The transmission mechanism includes two first cranks, two first rocker arms, a first linkage rod, two second cranks, two second rocker arms and a second linkage rod. An end of the first linkage rod is connected between the two first cranks, and another end of the first linkage rod is connected between the two first rocker arms, so as to form a bridge-type support structure. An end of the second linkage rod is connected between the two second cranks, and another end of the second linkage rod is connected between the two second rocker arms, so as to form a bridge-type support structure. The flapping-wing mechanism is connected to one of the two first rocker arms and one of the two second rocker arms.

7 Claims, 11 Drawing Sheets

FLAPPING-WING AERIAL VEHICLE

BACKGROUND OF THE INVENTION

1. Field of the Invention

The invention relates to a flapping-wing aerial vehicle and, more particularly, to a flapping-wing aerial vehicle capable of extending the life of a transmission mechanism, increasing output torque and improving flight efficiency.

2. Description of the Prior Art

A flapping-wing aerial vehicle has a shape and mechanism that imitates birds, insects, bats, etc., and it can flap its wings to generate thrust to achieve flight. In general, the flapping-wing aerial vehicle uses a transmission mechanism to drive a flapping-wing mechanism to flap the wings. At present, a crank of the transmission mechanism of the flapping-wing aerial vehicle is mostly supported on a single side. When the crank rotates, it is easy to shake due to insufficient support and then fall off, thereby shortening the life of the transmission mechanism and affecting the output torque and flight efficiency.

SUMMARY OF THE INVENTION

The invention provides a flapping-wing aerial vehicle capable of extending the life of a transmission mechanism, increasing output torque and improving flight efficiency, so as to solve the aforesaid problems.

According to an embodiment of the invention, a flapping-wing aerial vehicle comprises a body, a driving mechanism, a transmission mechanism and a flapping-wing mechanism. The driving mechanism is fixed to the body. The transmission mechanism comprises two first cranks, two first rocker arms, a first linkage rod, two second cranks, two second rocker arms and a second linkage rod. The two first cranks are rotatably disposed on the body and connected to the driving mechanism. The two first rocker arms are rotatably disposed on the body. An end of the first linkage rod is connected between the two first cranks, and another end of the first linkage rod is connected between the two first rocker arms. The two second cranks are rotatably disposed on the body and connected to the driving mechanism. The two first cranks and the two second cranks are located at opposite sides of the body. The two second rocker arms are rotatably disposed on the body. The two first rocker arms and the two second rocker arms are located at opposite sides of the body. An end of the second linkage rod is connected between the two second cranks, and another end of the second linkage rod is connected between the two second rocker arms. The flapping-wing mechanism is connected to one of the two first rocker arms and one of the two second rocker arms.

In an embodiment, the driving mechanism comprises a driving motor, a reduction gear, a first crank gear and a second crank gear. The reduction gear meshes with an output gear of the driving motor. The first crank gear meshes with the reduction gear and is connected to one of the two first cranks. The second crank gear meshes with the first crank gear and is connected to one of the two second cranks.

In an embodiment, the body comprises a first frame, a second frame, a third frame, a fourth frame and a plurality of support rods. The driving motor and the reduction gear are fixed to opposite sides of the first frame. The first crank gear and the second crank gear are fixed to the second frame. One of the two first cranks and one of the two second cranks are fixed to a middle portion of the third frame. One of the two first rocker arms and one of the two second rocker arms are fixed to an upper portion of the third frame. Another one of the two first cranks and another one of the two second cranks are fixed to a middle portion of the fourth frame. Another one of the two first rocker arms and another one of the two second rocker arms are fixed to an upper portion of the fourth frame. The first linkage rod and the second linkage rod are located between the third frame and the fourth frame. The plurality of support rods pass through the first frame, the second frame, the third frame and the fourth frame.

In an embodiment, the flapping-wing aerial vehicle further comprises a tail wing connected to one of the plurality of support rods.

In an embodiment, the flapping-wing mechanism comprises a first wing rod, a second wing rod, a first wing and a second wing. The first wing rod is fixed to one of the two first rocker arms. The second wing rod is fixed to one of the two second rocker arms. Two halves of the first wing are respectively connected to the first wing rod and the second wing rod. Two halves of the second wing are respectively connected to the first wing rod and the second wing rod. The first rocker arm and the second rocker arm configured to fix the first wing rod and the second wing rod are located at diagonally opposite corners of the third frame and the fourth frame. The first wing and the second wing are stacked up and down. Middle portions of the first wing and the second wing are bonded to each other.

In an embodiment, the body further comprises a fifth frame, the plurality of support rods passes through the fifth frame, and the first wing and the second wing are connected to the fifth frame.

In an embodiment, the transmission mechanism further comprises a first fixing base and a second fixing base. The first fixing base fixes the first wing rod to the first rocker arm. The second fixing base fixes the second wing rod to the second rocker arm.

As mentioned in the above, the invention drives the crank to rotate through the rotation of the driving motor, and uses the linkage rod to convert the rotation of the crank into reciprocating flapping-wing motion. In the invention, the linkage rod are connected between two cranks to form a bridge-type support structure, such that the cranks can be stably supported without shaking or falling off when rotating. The bridge-type support structure fixes the components without interfering with the movement between the crank and the linkage rod, thereby allowing the transmission mechanism to perform well even at high operation speeds or under high loads. Thus, the invention simultaneously solves the mechanical failure during operation, enables the torque of the driving motor to be transmitted more effectively, and also enables the thrust to be effectively increased. Accordingly, the invention can extend the life of the transmission mechanism, increase the output torque and improve the flight efficiency. Furthermore, the invention further connects the linkage rod between two rocker arms to improve the movement stability of the linkage rod. When the driving mechanism drives the crank to rotate, the crank drives the rocker arm to reciprocate through the linkage rod, thereby causing the flapping-wing mechanism to flapping the wings. In an embodiment, two rocker arms configured to fix two wing rods are located at diagonally opposite corners of the third frame and the fourth frame, such that the two wing rods are offset forward and backward to form scissor-shaped wings. Accordingly, the two wing rods can be opened or closed without interfering with each other. Since the invention uses the bridge-type support structure to enhance the overall structural strength, the overall structure of the flapping-wing aerial vehicle does not have to bear excessive loads. Therefore, the components of the flapping-wing aerial vehicle can be made of lighter materials while ensuring a large thrust output, such that the flapping-wing aerial vehicle can not only glide or fly forward, but also overcome its own weight to hover upright.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
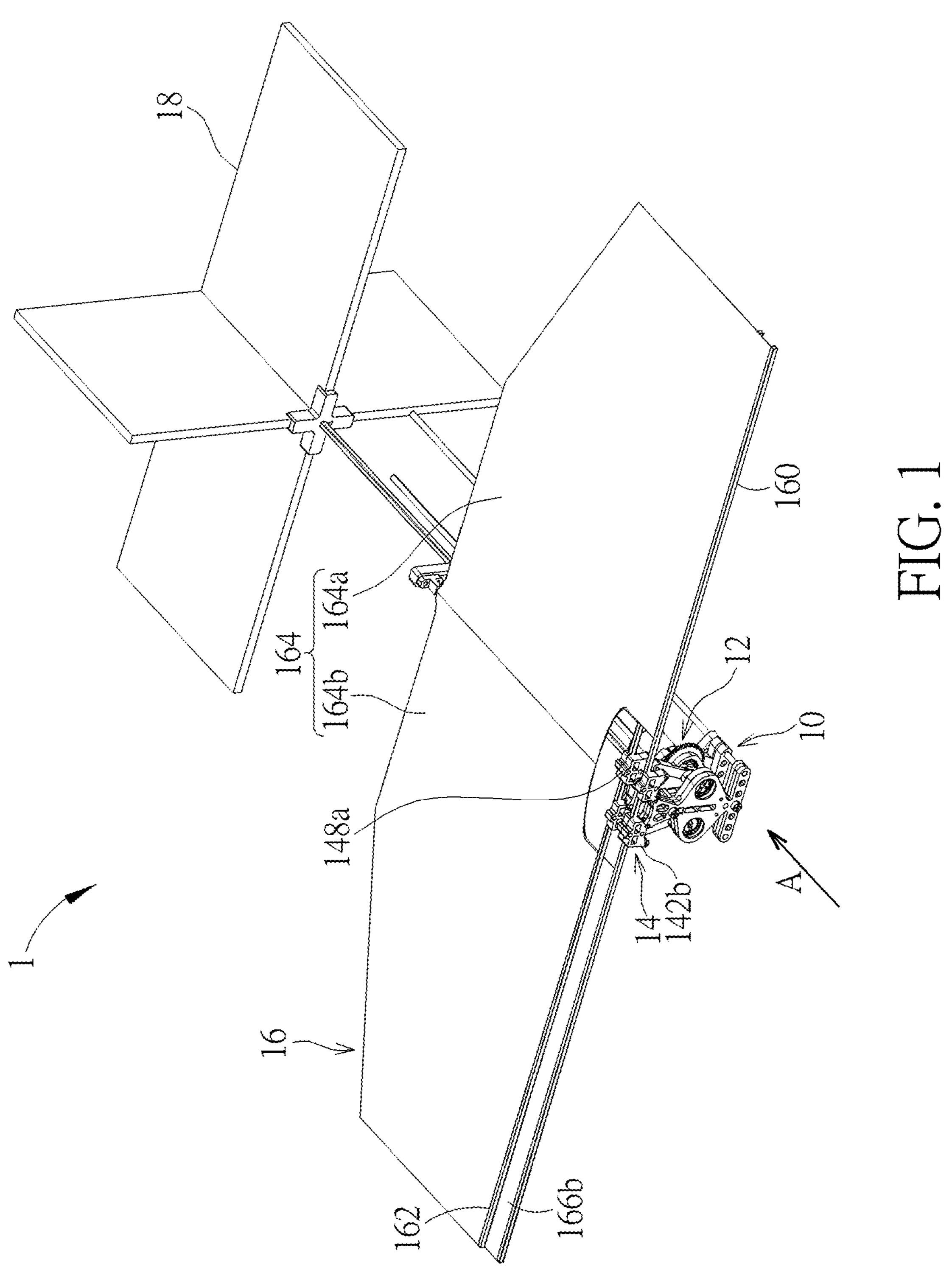
FIG. 1 is a perspective view illustrating a flapping-wing aerial vehicle according to an embodiment of the invention.
Figure 2:
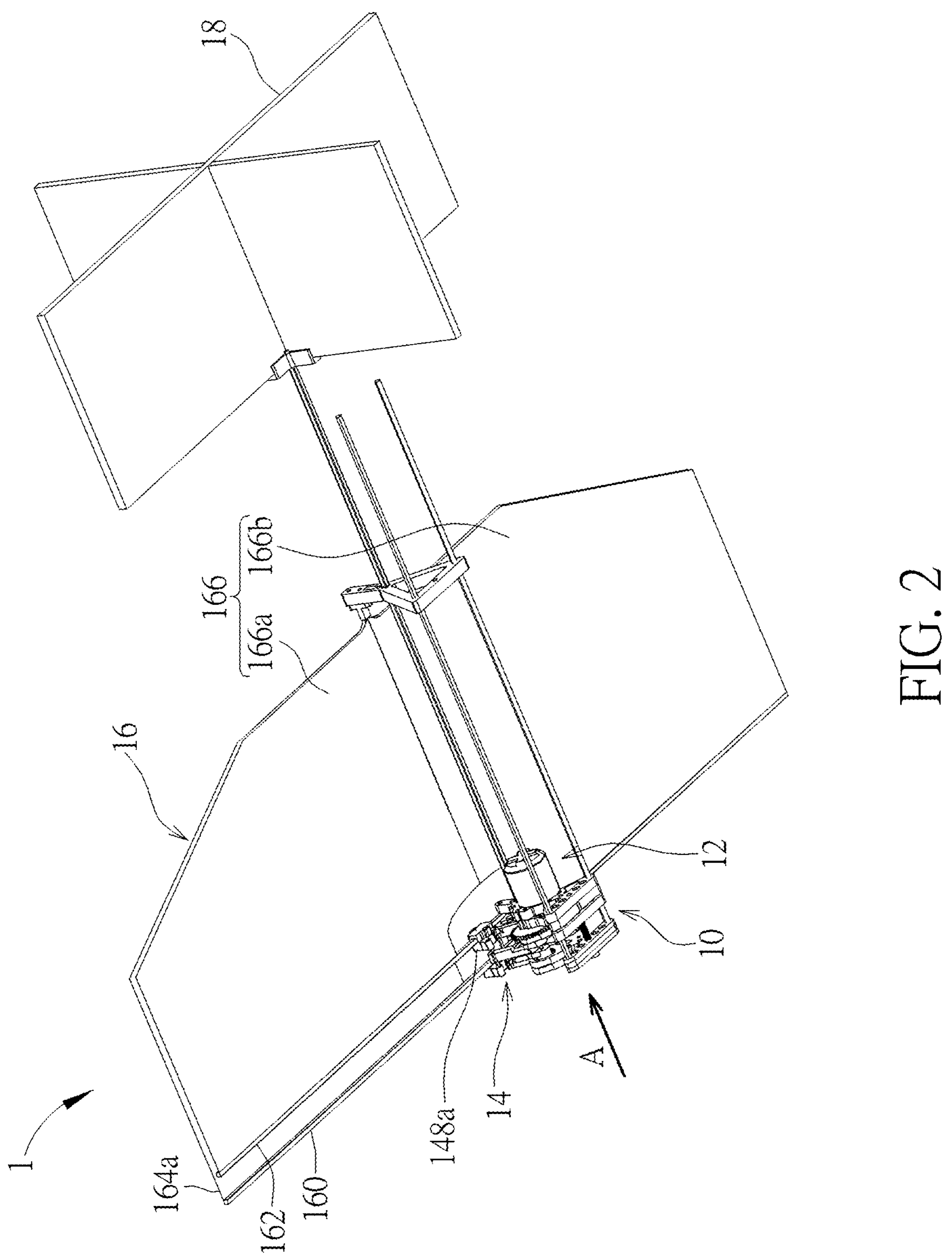
FIG. 2 is a perspective view illustrating the flapping-wing aerial vehicle shown in FIG. 1 from another viewing angle.
Figure 3:
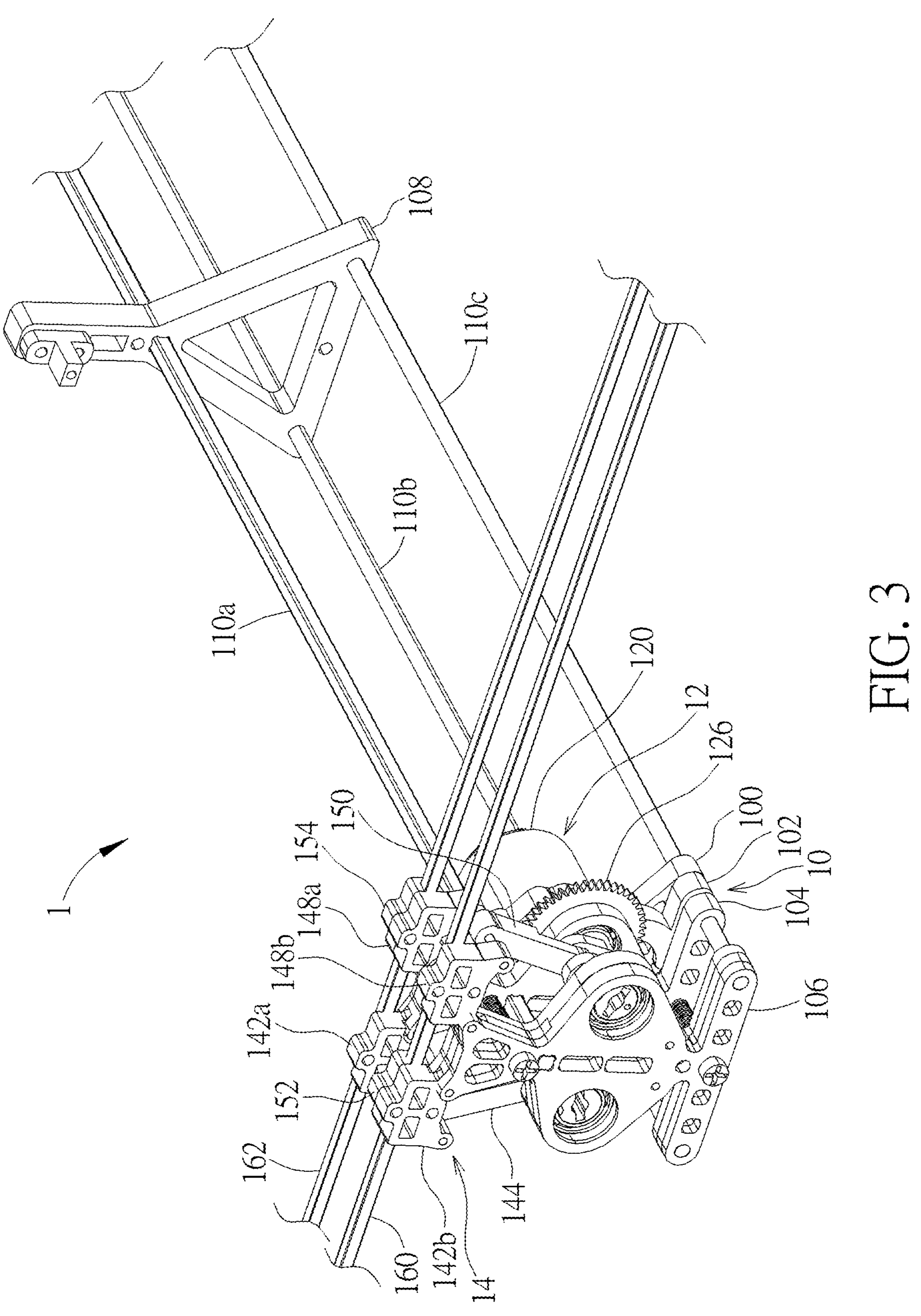
FIG. 3 is a partial perspective view illustrating the flapping-wing aerial vehicle shown in FIG. 1.
Figure 4:
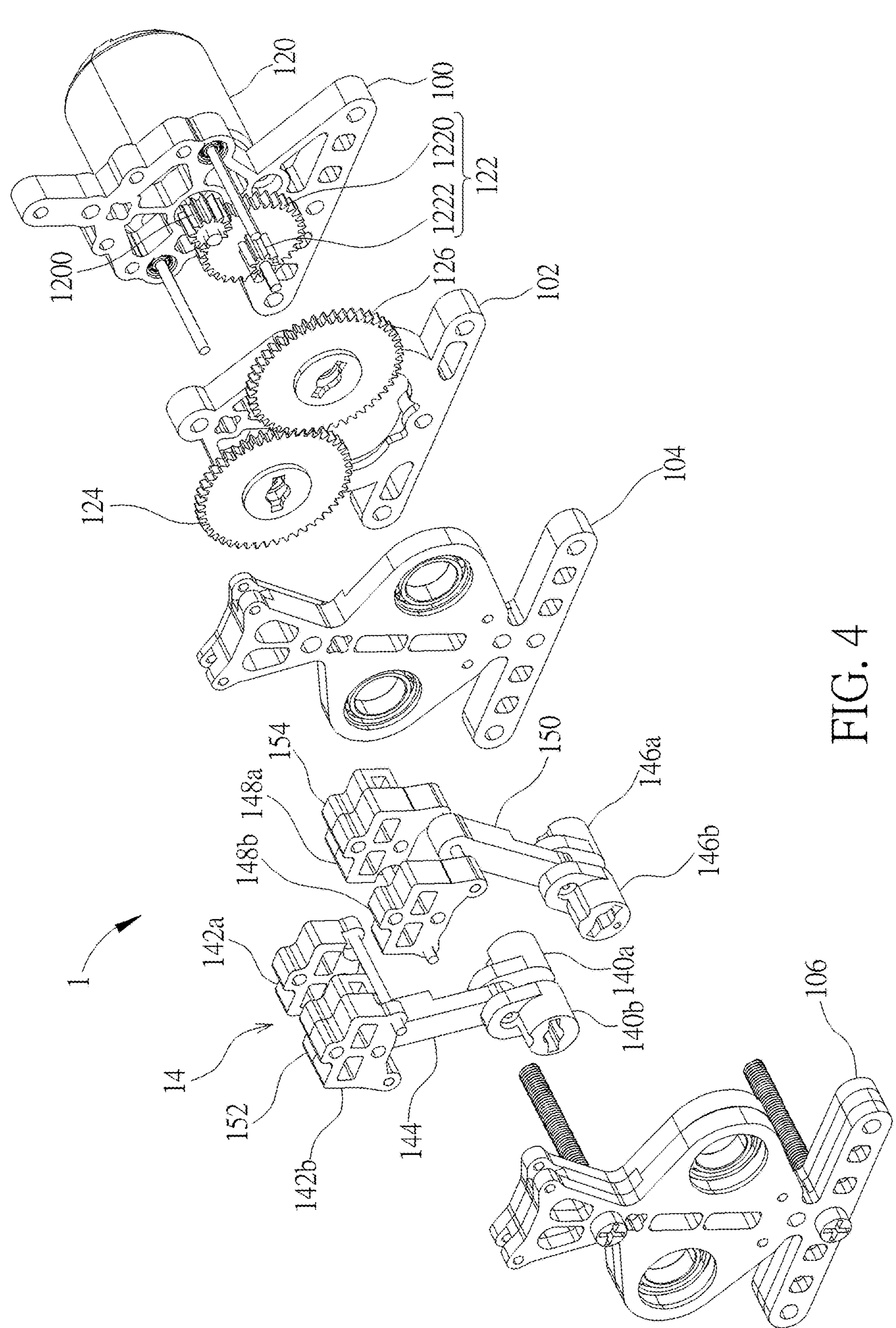
FIG. 4 is a partial exploded view illustrating the flapping-wing aerial vehicle shown in FIG. 3.
Figure 5:
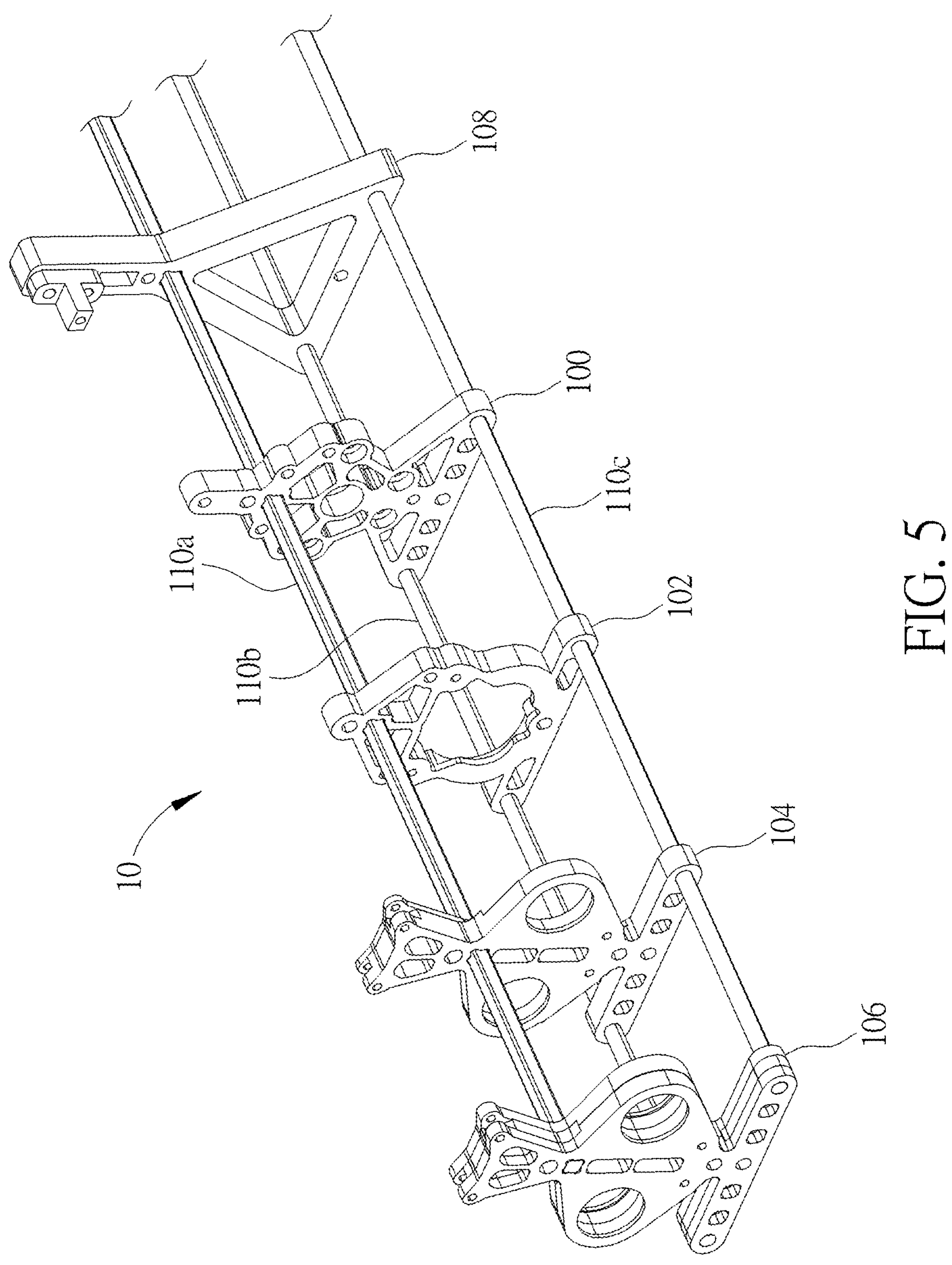
FIG. 5 is an exploded view illustrating a body shown in FIG. 3.
Figure 6:
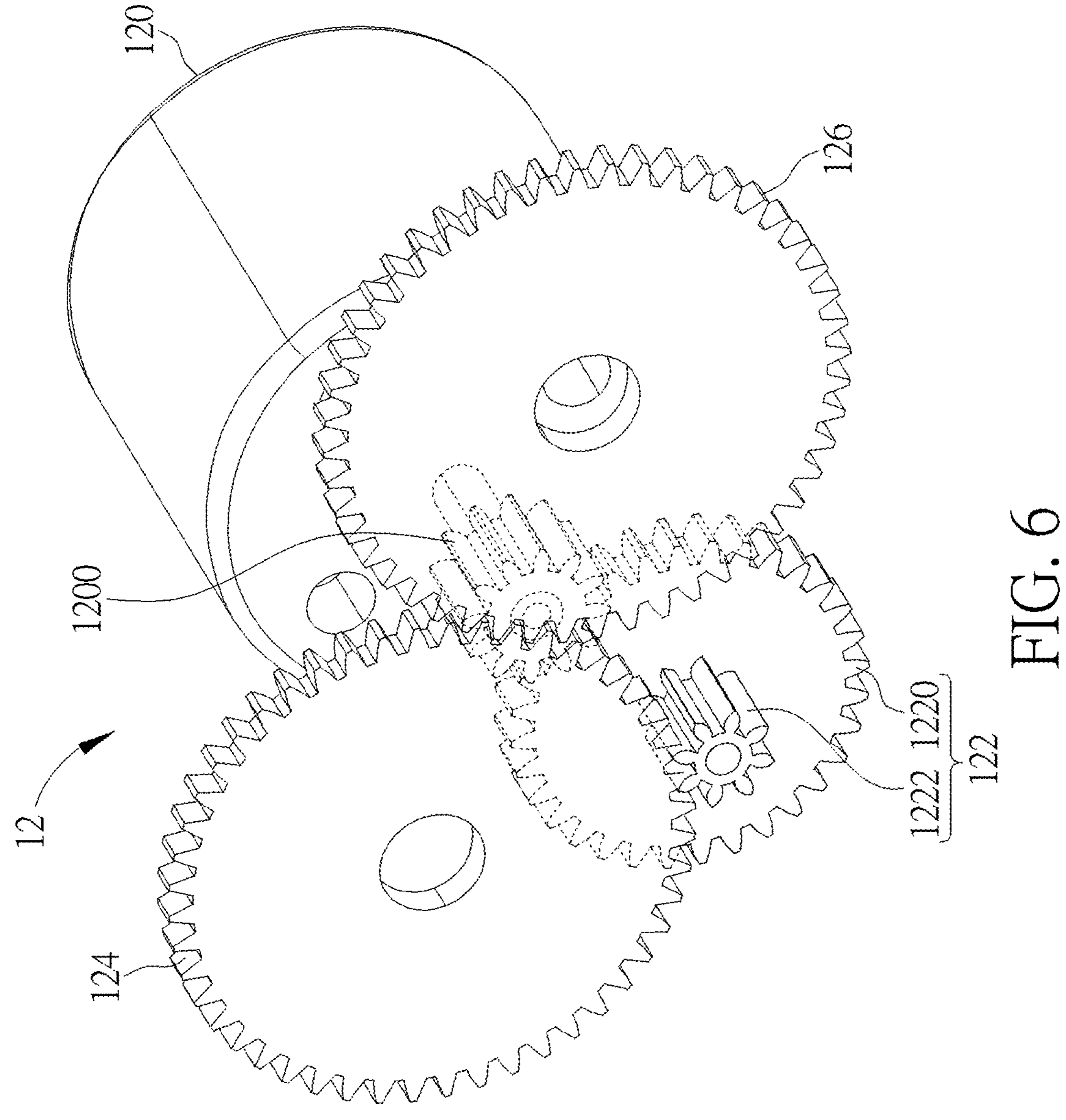
FIG. 6 is a perspective view illustrating a driving mechanism shown in FIG. 3.
Figure 7:
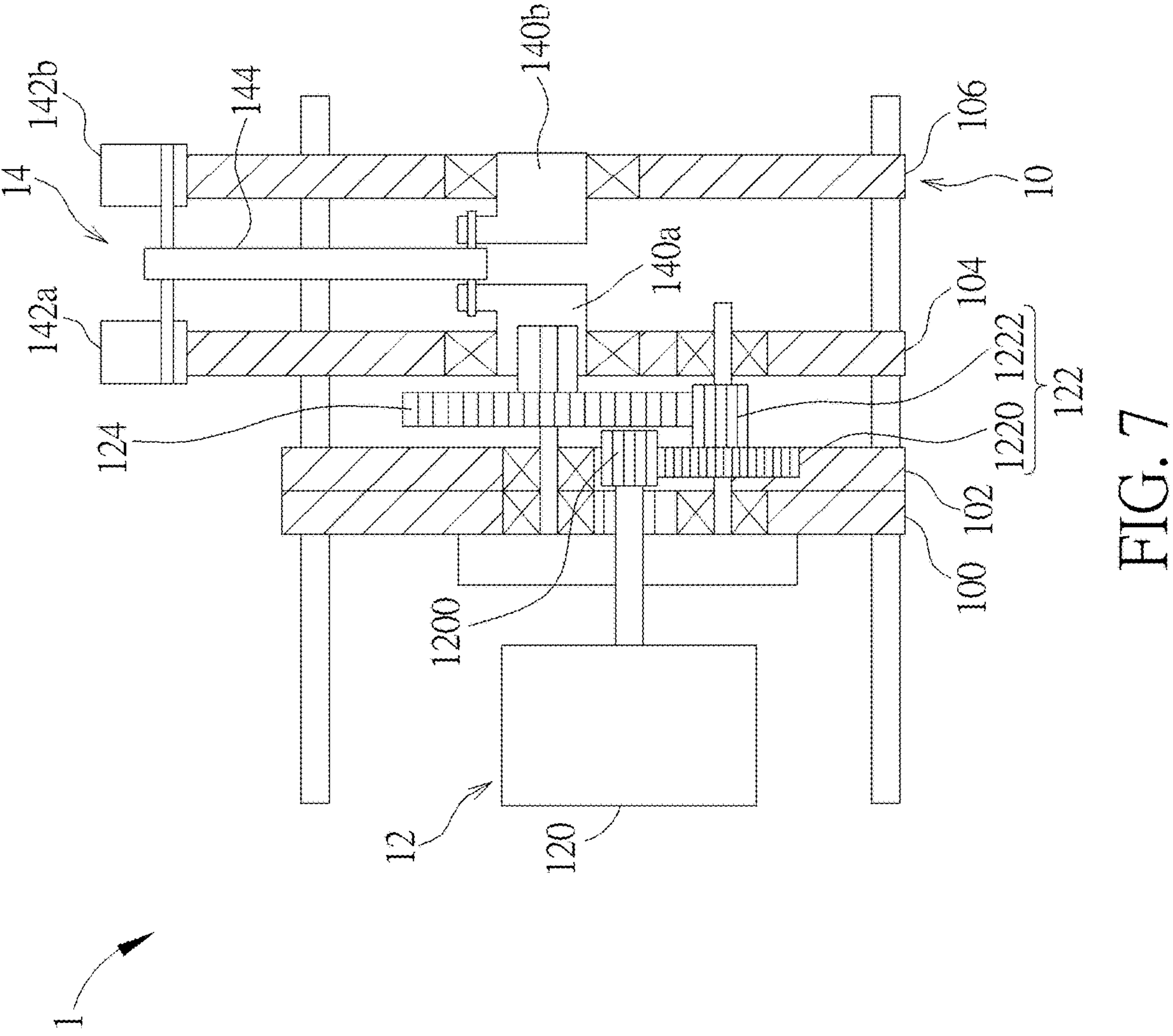
FIG. 7 is a partial schematic side view illustrating the flapping-wing aerial vehicle shown in FIG. 3.
Figure 8:
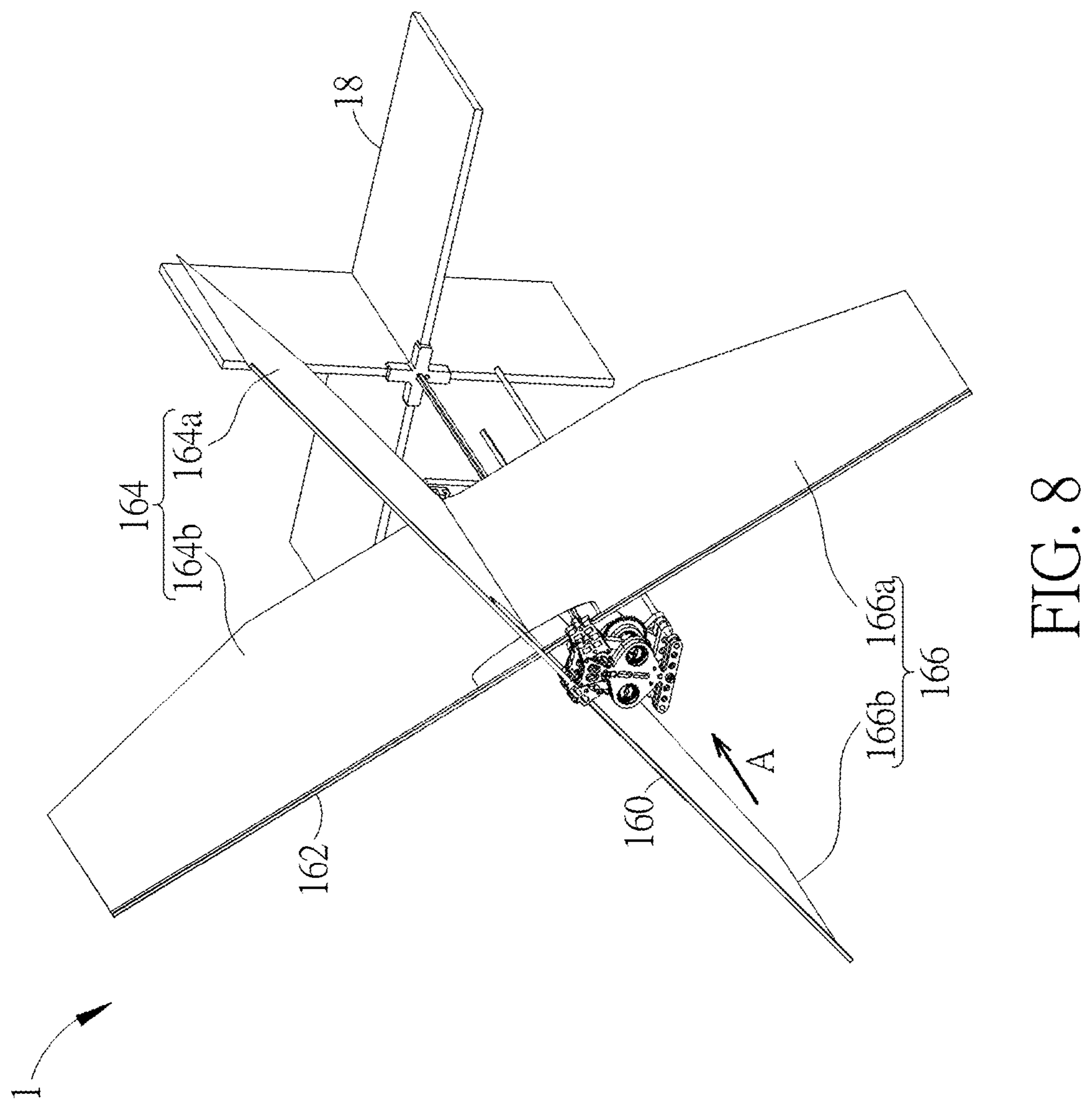
FIG. 8 is a perspective view illustrating a first wing rod and a second wing rod shown in FIG. 1 being opened.
Figure 9:
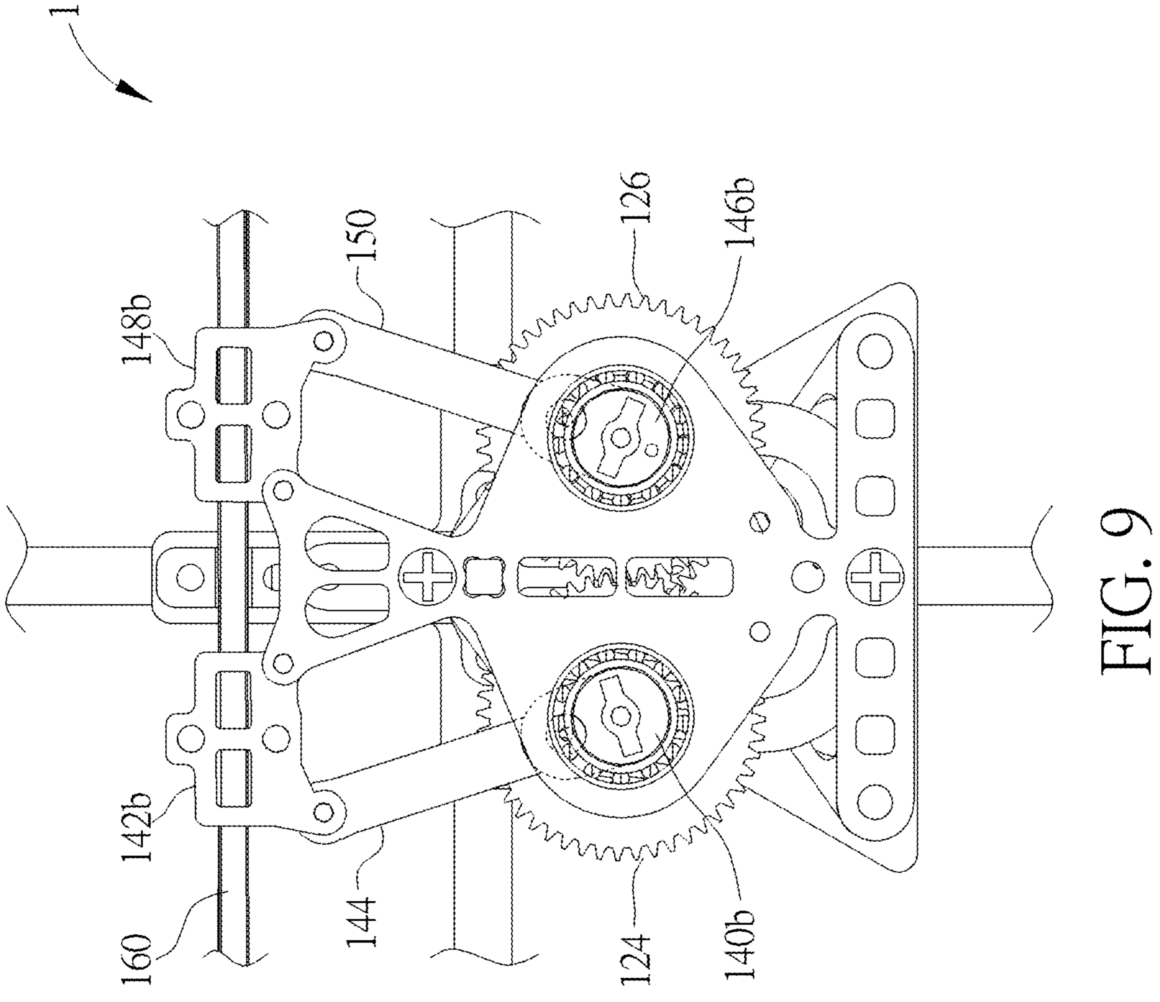
FIG. 9 is a partial front view illustrating the flapping-wing aerial vehicle shown in FIG. 1.
Figure 10:
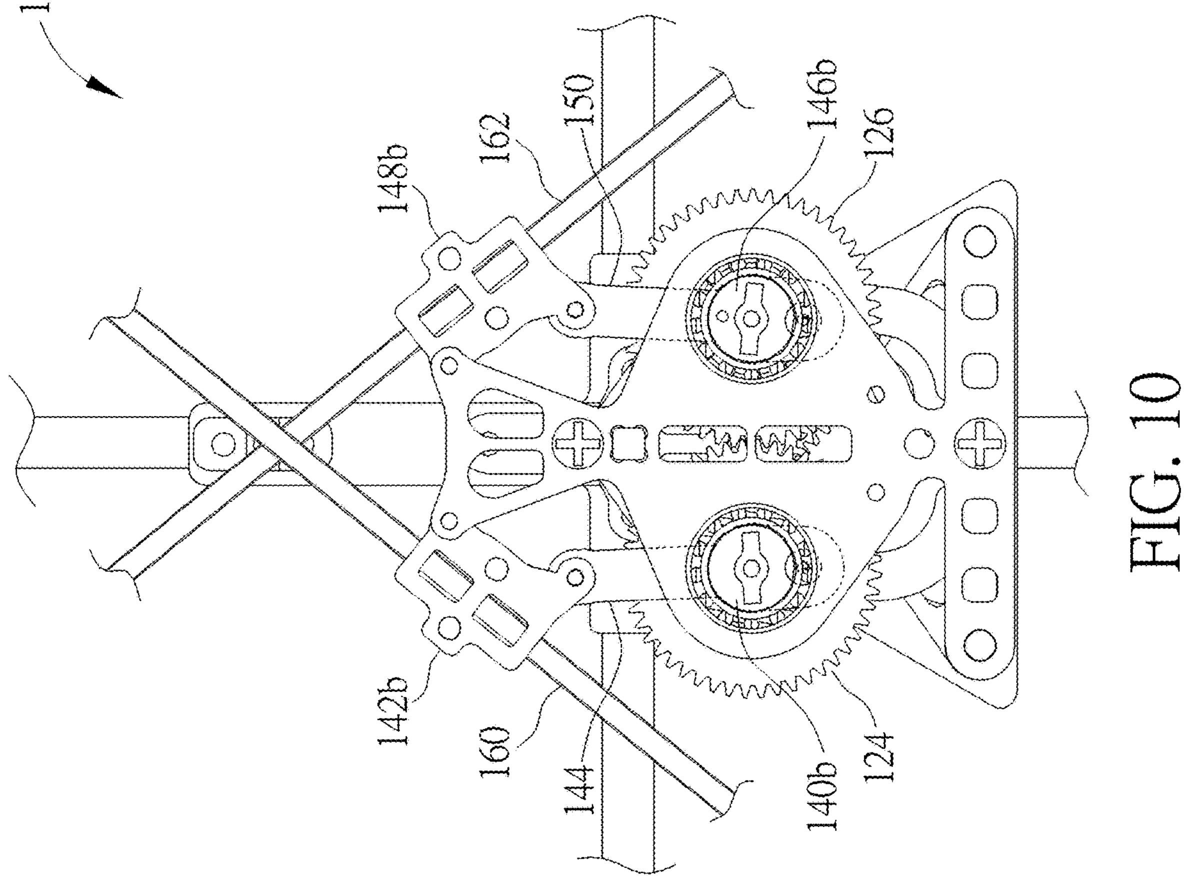
FIG. 10 is a partial front view illustrating the flapping-wing aerial vehicle shown in FIG. 8.
Figure 11:
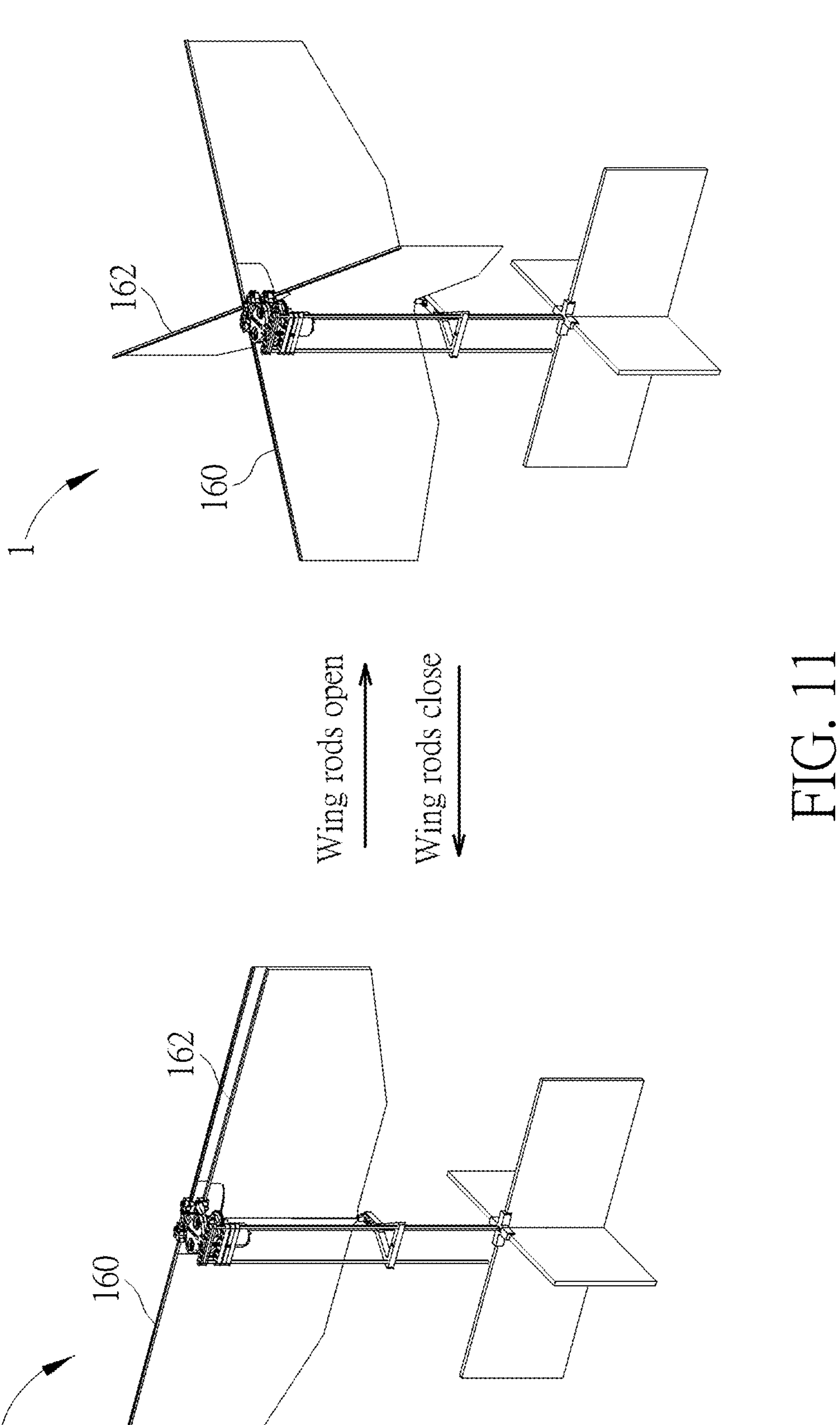
FIG. 11 is a schematic view illustrating the flapping-wing aerial vehicle shown in FIG. 1 hovering upright.

Referring to FIGS. 1 to 11, FIG. 1 is a perspective view illustrating a flapping-wing aerial vehicle 1 according to an embodiment of the invention, FIG. 2 is a perspective view illustrating the flapping-wing aerial vehicle 1 shown in FIG. 1 from another viewing angle, FIG. 3 is a partial perspective view illustrating the flapping-wing aerial vehicle 1 shown in FIG. 1, FIG. 4 is a partial exploded view illustrating the flapping-wing aerial vehicle 1 shown in FIG. 3, FIG. 5 is an exploded view illustrating a body 10 shown in FIG. 3, FIG. 6 is a perspective view illustrating a driving mechanism 12 shown in FIG. 3, FIG. 7 is a partial schematic side view illustrating the flapping-wing aerial vehicle 1 shown in FIG. 3, FIG. 8 is a perspective view illustrating a first wing rod 160 and a second wing rod 162 shown in FIG. 1 being opened, FIG. 9 is a partial front view illustrating the flapping-wing aerial vehicle 1 shown in FIG. 1, FIG. 10 is a partial front view illustrating the flapping-wing aerial vehicle 1 shown in FIG. 8, and FIG. 11 is a schematic view illustrating the flapping-wing aerial vehicle 1 shown in FIG. 1 hovering upright.

As shown in FIGS. 1 to 4, the flapping-wing aerial vehicle 1 comprises a body 10, a driving mechanism 12, a transmission mechanism 14, a flapping-wing mechanism 16 and a tail wing 18. The driving mechanism 12 is fixed to the body 10. The transmission mechanism 14 is disposed on the body 10 and connected to the driving mechanism 12. The flapping-wing mechanism 16 is connected to the transmission mechanism 14. The driving mechanism 12 can drive the transmission mechanism 14 to drive the flapping-wing mechanism 16 to flap wings, such that the flapping-wing aerial vehicle 1 may glide, fly forward or hover upright, as shown in FIGS. 1, 8 and 11. The tail wing 18 is connected to the body 10 for directional control.

As shown in FIGS. 3 and 5, the body 10 may comprise a first frame 100, a second frame 102, a third frame 104, a fourth frame 106, a fifth frame 108 and a plurality of support rods 110*a*, 110*b*, 110*c*. The support rods 110*a*, 110*b*, 110*c* pass through the first frame 100, the second frame 102, the third frame 104, the fourth frame 106 and the fifth frame 108, so as to form a triangular support structure. The tail wing 18 may be connected to one of the support rods 110*a*, 110*b*, 110*c*. In this embodiment, the tail wing 18 may be connected to the support rod 110*a*. It should be noted that the number and position of the support rods may be determined according to practical applications, so the invention is not limited to the embodiment shown in the figure.

As shown in FIG. 6, the driving mechanism 12 may comprise a driving motor 120, a reduction gear 122, a first crank gear 124 and a second crank gear 126. The driving motor 120 and the reduction gear 122 may be fixed to opposite sides of the first frame 100, and the first crank gear 124 and the second crank gear 126 may be fixed to the second frame 102 side by side, as shown in FIGS. 4 and 7. The reduction gear 122 meshes with an output gear 1200 of the driving motor 120, the first crank gear 124 meshes with the reduction gear 122, and the second crank gear 126 meshes with the first crank gear 124. In this embodiment, the reduction gear 122 may comprise a first gear portion 1220 and a second gear portion 1222. The output gear 1200 of the driving motor 120 may mesh with the first gear portion 1220 of the reduction gear 122, and the first crank gear 124 may mesh with the second gear portion 1222 of the reduction gear 122. In practical applications, the number of teeth of the first gear portion 1220 may be larger than the number of teeth of the second gear portion 1222 to achieve a deceleration effect. Accordingly, the reduction gear 122 may convert high-speed rotation output by the driving motor 120 into low-speed and high-torque rotation. The driving motor 120 may drive the reduction gear 122 to rotate through the output gear 1200, such that the reduction gear 122 drives the first crank gear 124 to rotate and the first crank gear 124 drives the second crank gear 126 to rotate, wherein the first crank gear 124 and the second crank gear 126 rotate in opposite directions.

As shown in FIGS. 3 and 4, the transmission mechanism 14 may comprise two first cranks 140*a*, 140*b*, two first rocker arms 142*a*, 142*b*, a first linkage rod 144, two second cranks 146*a*, 146*b*, two second rocker arms 148*a*, 148*b* and a second linkage rod 150. The two first cranks 140*a*, 140*b* are rotatably disposed on the body 10 and connected to the driving mechanism 12. The two first rocker arms 142*a*, 142*b* are rotatably disposed on the body 10. An end of the first linkage rod 144 is connected between the two first cranks 140*a*, 140*b*, and another end of the first linkage rod 144 is connected between the two first rocker arms 142*a*, 142*b*. In this embodiment, a rotating shaft (e.g. high-speed steel) may pass through the two first cranks 140*a*, 140*b* and an end of the first connecting rod 144 for fixation, and another rotating shaft (e.g. high-speed steel) may pass through the two first t rocker arms 142*a*, 142*b* and another end of the first connecting rod 144 for fixation. The two second cranks 146*a*, 146*b* are rotatably disposed on the body 10 and connected to the driving mechanism 12. The two second rocker arms 148*a*, 148*b* are rotatably disposed on the body 10. An end of the second linkage rod 150 is connected between the two second cranks 146*a*, 146*b*, and another end of the second linkage rod 150 is connected between the two second rocker arms 148*a*, 148*b*. In this embodiment, a rotating shaft (e.g. high-speed steel) may pass through the two second cranks 146*a*, 146*b* and an end of the second linkage rod 150 for fixation, and another rotating shaft (e.g. high-speed steel) may pass through the two second rocker arms 148*a*, 148*b* and another end of the second linkage rod 150 for fixation.

The two first cranks 140*a*, 140*b* and the two second cranks 146*a*, 146*b* are located at opposite sides of the body 10, and the two first rocker arms 142*a*, 142*b* and the two second rocker arms 148*a*, 148*b* are also located at opposite sides of the body 10. In this embodiment, one of the two first cranks 140*a*, 140*b* and one of the two second cranks 146*a*, 146*b* may be fixed to a middle portion of the third frame 104, and one of the two first rocker arms 142*a*, 142*b* and one of the two second rocker arms 148*a*, 148*b* may be fixed to an upper portion of the third frame 104. Furthermore, another one of the two first cranks 140*a*, 140*b* and another one of the two second cranks 146*a*, 146*b* may be fixed to a middle portion of the fourth frame 106, and another one of the two first rocker arms 142*a*, 142*b* and another one of the two second rocker arms 148*a*, 148*b* may be fixed to an upper portion of the fourth frame 106. As shown in FIGS. 3 and 4, the first crank 140*a* and the second crank 146*a* may be fixed to opposite sides of the middle portion of the third frame 104, the first rocker arm 142*a* and the second rocker arm 148*a* may be fixed to opposite sides of the upper portion of the third frame 104, the first crank 140*b* and the second crank 146*b* may be fixed to opposite sides of the middle portion of the fourth frame 106, and the first rocker arm 142*b* and the second rocker arm 148*b* may be fixed to opposite sides of the upper portion of the fourth frame 106. At this time, the first linkage rod 144 and the second linkage rod 150 are located between the third frame 104 and the fourth frame 106.

Still further, the first crank gear 124 may be connected to one of the two first cranks 140*a*, 140*b*, and the second crank gear 126 may be connected to one of the two second cranks 146*a*, 146*b*. In this embodiment, the first crank gear 124 may be connected to the first crank 140*a* and the second crank gear 126 may be connected to the second crank 146*a*. Thus, the first crank gear 124 and the second crank gear 126 may respectively drive the first crank 140*a* and the second crank 146*a* to rotate, so as to drive the first linkage rod 144 and the second linkage rod 150 to move upward and downward. At the same time, the first linkage rod 144 and the second linkage rod 150 respectively drive the first rocker arms 142*a*, 142*b* and the second rocker arms 148*a*, 148*b* to reciprocate, thereby causing the flapping-wing mechanism 16 to flapping the wings. Since the first linkage rod 144 is connected between the two first cranks 140*a*, 140*b* to form a bridge-type support structure, and the second linkage rod 150 is also connected between the two second cranks 146*a*, 146*b* to form a bridge-type support structure, the first cranks 140*a*, 140*b* and the second cranks 146*a*, 146*b* can be stably supported without shaking or falling off when rotating. Accordingly, the invention can extend the life of the transmission mechanism 14, increase the output torque and improve the flight efficiency. Since the invention uses the bridge-type support structure to enhance the overall structural strength, the overall structure of the flapping-wing aerial vehicle 1 does not have to bear excessive loads. Therefore, the components of the flapping-wing aerial vehicle 1 can be made of lighter materials while ensuring a large thrust output, such that the flapping-wing aerial vehicle 1 can not only glide or fly forward (as shown in FIGS. 1 and 8), but also overcome its own weight to hover upright (as shown in FIG. 11).

As shown in FIGS. 1 and 2, the flapping-wing mechanism 16 may comprise a first wing rod 160, a second wing rod 162, a first wing 164 and a second wing 166. The first wing rod 160 is fixed to one of the two first rocker arms 142*a*, 142*b*, and the second wing rod 162 is fixed to one of the two second rocker arms 148*a*, 148*b*. In this embodiment, the first wing rod 160 is fixed to the first rocker arm 142*b* and the second wing rod 162 is fixed to the second rocker arm 148*a*. As shown in FIG. 3, the first rocker arm 142*b* and the second rocker arm 148*a* configured to fix the first wing rod 160 and the second wing rod 162 are located at diagonally opposite corners of the third frame 104 and the fourth frame 106, such that the first wing rod 160 and the second wing rod 162 are offset forward and backward to form scissor-shaped wings. Accordingly, the first wing rod 160 and the second wing rod 162 can be opened or closed without interfering with each other, as shown in FIGS. 1, 8, 9 and 10. In this embodiment, the transmission mechanism 14 may further comprise a first fixing base 152 and a second fixing base 154, as shown in FIGS. 3 and 4. The first fixing base 152 is configured to fix the first wing rod 160 to the first rocker arm 142*b*, and the second fixing base 154 is configured to fix the second wing rod 162 to the second rocker arm 148*a*.

Furthermore, the first wing 164 and the second wing 166 are stacked up and down, and the middle portions of the first wing 164 and the second wing 166 are bonded to each other. Two halves of the first wing 164 are respectively connected to the first wing rod 160 and the second wing rod 162, and two halves of the second wing 166 are also respectively connected to the first wing rod 160 and the second wing rod 162. As shown in FIGS. 1 and 8, from the front view of the flapping-wing aerial vehicle 1 (direction of arrow A), the right half 164*a* of the first wing 164 may be connected to the first wing rod 160 and the left half 164*b* of the first wing 164 may be connected to the second wing rod 162. As shown in FIGS. 2 and 8, from the front view of the flapping-wing aerial vehicle 1 (direction of arrow A), the right half 166*a* of the second wing 166 may be connected to the second wing rod 162 and the left half 166*b* of the second wing 166 may be connected to the first wing rod 160. Moreover, the tail portions of the first wing 164 and the second wing 166 may be connected to the fifth frame 108. Thus, when the first wing rod 160 and the second wing rod 162 are opened or closed, the first wing rod 160 and the second wing rod 162 can drive the first wing 164 and the second wing 166 to flapping the wings. In this embodiment, the first wing rod 160 and the second wing rod 162 may be carbon fiber rods, and the first wing 164 and the second wing 166 may be flexible films, but the invention is not so limited.

In this embodiment, bearings may be disposed at the rotating shafts of the rotatable components (e.g. reduction gear, first crank gear, second crank gear, first crank, second crank, etc.) to allow the rotatable components to rotate smoothly.

As mentioned in the above, the invention drives the crank to rotate through the rotation of the driving motor, and uses the linkage rod to convert the rotation of the crank into reciprocating flapping-wing motion. In the invention, the linkage rod are connected between two cranks to form a bridge-type support structure, such that the cranks can be stably supported without shaking or falling off when rotating. The bridge-type support structure fixes the components without interfering with the movement between the crank and the linkage rod, thereby allowing the transmission mechanism to perform well even at high operation speeds or under high loads. Thus, the invention simultaneously solves the mechanical failure during operation, enables the torque of the driving motor to be transmitted more effectively, and also enables the thrust to be effectively increased. Accordingly, the invention can extend the life of the transmission mechanism, increase the output torque and improve the flight efficiency. Furthermore, the invention further connects the linkage rod between two rocker arms to improve the movement stability of the linkage rod. When the driving mechanism drives the crank to rotate, the crank drives the rocker arm to reciprocate through the linkage rod, thereby causing the flapping-wing mechanism to flapping the wings. In an embodiment, two rocker arms configured to fix two wing rods are located at diagonally opposite corners of the third frame and the fourth frame, such that the two wing rods are offset forward and backward to form scissor-shaped wings. Accordingly, the two wing rods can be opened or closed without interfering with each other. Since the invention uses the bridge-type support structure to enhance the overall structural strength, the overall structure of the flapping-wing aerial vehicle does not have to bear excessive loads. Therefore, the components of the flapping-wing aerial vehicle can be made of lighter materials while ensuring a large thrust output, such that the flapping-wing aerial vehicle can not only glide or fly forward, but also overcome its own weight to hover upright.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flapping-wing aerial vehicle comprising:
- a body;
- a driving mechanism fixed to the body;
- a transmission mechanism comprising:
  - two first cranks rotatably disposed on the body and connected to the driving mechanism;
  - two first rocker arms rotatably disposed on the body;
  - a first linkage rod, an end of the first linkage rod being connected between the two first cranks, another end of the first linkage rod being connected between the two first rocker arms, so as to form a bridge-type pin support structure;
  - two second cranks rotatably disposed on the body and connected to the driving mechanism, the two first cranks and the two second cranks being located at opposite sides of the body;
  - two second rocker arms rotatably disposed on the body, the two first rocker arms and the two second rocker arms being located at opposite sides of the body; and
  - a second linkage rod, an end of the second linkage rod being connected between the two second cranks, another end of the second linkage rod being connected between the two second rocker arms, so as to form a bridge-type bearing support structure; and
- a flapping-wing mechanism connected to one of the two first rocker arms and one of the two second rocker arms.

2. The flapping-wing aerial vehicle of claim 1, wherein the driving mechanism comprises:
- a driving motor;
- a reduction gear meshing with an output gear of the driving motor;
- a first crank gear meshing with the reduction gear and connected to one of the two first cranks; and
- a second crank gear meshing with the first crank gear and connected to one of the two second cranks.

3. The flapping-wing aerial vehicle of claim 2, wherein the body comprises:
- a first frame, the driving motor and the reduction gear being fixed to opposite sides of the first frame;
- a second frame, the first crank gear and the second crank gear being fixed to the second frame;
- a third frame, one of the two first cranks and one of the two second cranks being fixed to a middle portion of the third frame, one of the two first rocker arms and one of the two second rocker arms being fixed to an upper portion of the third frame;
- a fourth frame, another one of the two first cranks and another one of the two second cranks being fixed to a middle portion of the fourth frame, another one of the two first rocker arms and another one of the two second rocker arms being fixed to an upper portion of the fourth frame, the first linkage rod and the second linkage rod being located between the third frame and the fourth frame; and
- a plurality of support rods passing through the first frame, the second frame, the third frame and the fourth frame.

4. The flapping-wing aerial vehicle of claim 3, further comprising a tail wing connected to one of the plurality of support rods.

5. The flapping-wing aerial vehicle of claim 3, wherein the flapping-wing mechanism comprises:
- a first wing rod fixed to one of the two first rocker arms;
- a second wing rod fixed to one of the two second rocker arms;
- a first wing, two halves of the first wing being respectively connected to the first wing rod and the second wing rod; and
- a second wing, two halves of the second wing being respectively connected to the first wing rod and the second wing rod;
- wherein the first rocker arm and the second rocker arm configured to fix the first wing rod and the second wing rod are located at diagonally opposite corners of the third frame and the fourth frame, the first wing and the second wing are stacked up and down, and middle portions of the first wing and the second wing are bonded to each other.

6. The flapping-wing aerial vehicle of claim 5, wherein the body further comprises a fifth frame, the plurality of support rods passes through the fifth frame, and the first wing and the second wing are connected to the fifth frame.

7. The flapping-wing aerial vehicle of claim 5, wherein the transmission mechanism further comprises:
- a first fixing base fixing the first wing rod to the first rocker arm; and
- a second fixing base fixing the second wing rod to the second rocker arm.

* * * * *